Aug. 27, 1946.  P. G. HOLT  2,406,374
DIFFERENTIAL RUDDER LEVER CONTROL
Filed Feb. 13, 1943
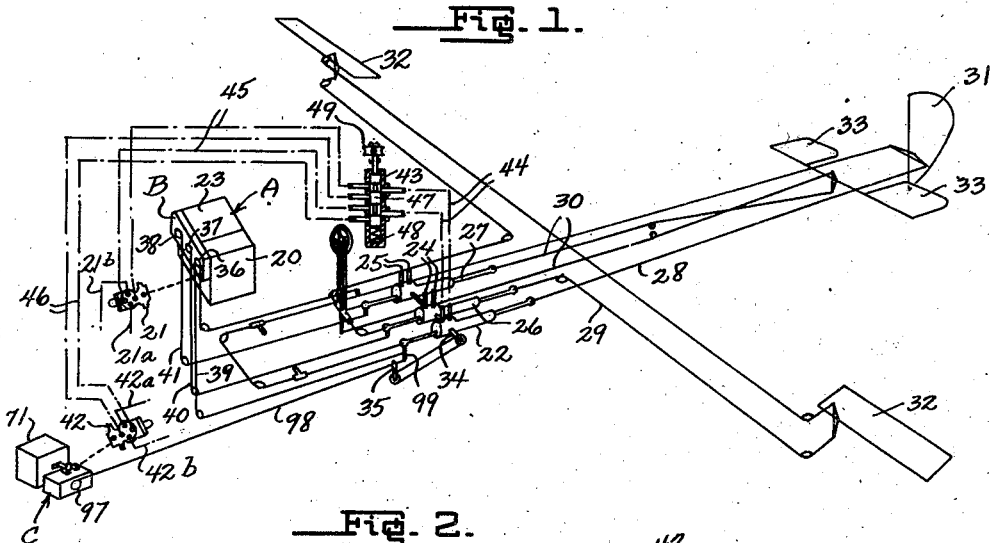
INVENTOR
Pliny G. Holt
BY
ATTORNEY Patented Aug. 27, 1946

2,406,374

UNITED STATES PATENT OFFICE 2,406,374

DIFFERENTIAL RUDDER LEVER CONTROL

Pliny G. Holt, United States Navy

Application February 13, 1943, Serial No. 475,759

5 Claims. (Cl. 244—75)

(Granted under the act of March 3, 1883, as amended April 30, 1928; 370 O. G. 757)

The invention relates to improvements in automatic pilots and more particularly to improved auxiliary control mechanism for use with automatic pilots of the general character shown and described in my co-pending U. S. patent application Serial No. 442,728, filed May 12, 1942.

An important object of the present invention is to provide an automatic gyro-pilot having auxiliary rudder control mechanism.

Another object of the invention is to provide an automatic gyro-pilot for bomber aircraft having auxiliary rudder control mechanism operable in response to changes in the direction setting of a bombsight.

Yet another object is the provision of an automatic gyro-pilot with rudder control mechanism including follow-up means transmitting motion in varying ratios depending on the rudder displacement.

A further object is to provide an automatic gyro-pilot having rudder control mechanism including a resilient follow-up connection.

The invention also aims to provide an automatic gyro-pilot for bombers including auxiliary rudder control mechanism of the character described and provided with manually operable adjusting means.

The invention further aims to provide an auxiliary control unit which may be used in lieu of the auxiliary control unit shown and described in my co-pending U. S. patent application Serial No. 466,301 filed November 20, 1942.

Other objects and advantages of the invention will become apparent during the course of the following detailed description, taken in connection with the accompanying drawing, forming a part of this specification, and in which drawing, Figure 1 is a diagrammatic perspective view of a gyro-pilot provided with the auxiliary rudder control mechanism and showing the servo cable connections to the aircraft control surfaces.

Fig. 2 is a fragmentary perspective view of the auxiliary control unit.

Figure 3 is a vertical transverse sectional view of the auxiliary control unit substantially on the line 3—3 of Figure 2.

Figure 4 is an enlarged fragmentary sectional detail view taken on the line 4—4 of Figure 3.

Figure 5 is an enlarged view of the slotted connection between 77 and 87 as viewed in Figure 3.

In the drawing, which for the purpose of illustration shows only a preferred embodiment of the invention, and wherein similar reference characters denote corresponding parts throughout the several views, the letter A generally designates a conventional gyro-pilot provided with a bank and climb proportioning unit B and an auxiliary rudder control unit C.

In the example shown, the gyro-pilot A is of the general character shown and described in U. S. Patent No. 1,992,970 granted to Sperry, Jr., et al., and includes a rudder servo control unit 20 having a conventional oil valve 21 for controlling the flow of oil through pressure and exhaust conduits 21a, 21b, to the rudder servo-motor 22, and an aileron and elevator servo control unit 23 hydraulically connected, as by suitable conduits 24, 25 to the aileron servo-motor 26 and elevator servo-motor 27, respectively. The rudder, aileron and elevator servo-motors 22, 26, 27 are connected, as by suitable cables 28, 29, 30 to the rudder, aileron and elevator surfaces 31, 32, 33, respectively. These servo-motors may be provided with a common shaft 34 rotatable, as by a hand lever 35, to a position wherein the servo-motors are by-passed for manual control.

Attached to the servo control units 20, 23 is a bank and climb proportioning unit B, such as shown and described in my co-pending U. S. patent application, Serial No. 442,728, filed May 12, 1942. This bank and climb proportioning unit B includes rudder, aileron and elevator follow-up pulleys 36, 37, 38, provided with follow-up connections 39, 40, 41, respectively, attached to the rudder, aileron and elevator servo-motors 22, 26, 27. The unit B transmits motion from the rudder follow-up connection 39 to the aileron and elevator follow-up connections 40, 41 whereby the amount of bank and climb is correlated to the amount of rudder displacement of the aircraft.

The auxiliary rudder servo control unit C includes an oil valve 42 for controlling the flow of oil through pressure and exhaust conduits 42a, 42b, to the rudder servo-motor 22. In order to selectively control the rudder servo-motor 22, a valve 43 is interposed between the oil valves 21, 42 and the servo-motor 22. This selector valve 43 is connected to the rudder servo-motor 22 by a pair of conduits 44 and to the oil valves 21, 42 by pairs of conduits 45, 46. The valve 43 is provided with a reciprocable piston 47 urged, as by an expansible coil spring 48, into a position wherein the conduits 46 communicate with the conduits 44. Engaging the piston 47 is a rotary cam 49 turnable to shift the piston so as to bring the conduits 45 into communication with the conduits 44.

Referring now to the auxiliary rudder control unit C, the same includes a box-like frame or chassis 50 having side plates 51, 52 and an end plate 53 to which the oil valve 42 is secured. Extending through the end plate 53 is a stem 54 forming part of the oil valve 42 and supported, for axial sliding movement, as by lugs 55. The valve 42 may be of a known type, such as the "Sperry" balanced oil valve, so that axial shifting of the stem 54 in either direction from a neutral position will permit oil to flow through the valve in a direction depending on the direction of shifting of the stem. That portion of the stem 54 intermediate the lugs 55 is provided with a block-like section 56 having an elongate slot 57 extending longitudinally of the stem and defined by spaced parallel side walls 58, 59. Slidably extending through the slot 57 is a lever 60 provided with a lateral pin 61 passing through a slot 62 extending longitudinally of the side wall 59. Thus the lever 60 is supported for sliding and swinging movement relative to the block-like section 56 of the stem. Fixed to a laterally offset lug 63 forming an integral part of the lever 60 is the bight portion 64 of an inverted U-shaped leaf spring 65 having its parallel end portions 66 disposed in straddling relation to the pin 61 and to a pin 67 fixed in the side wall 59 of the block-like section 56. The spring 65 and pin 67 constitute a resilient connection between the lever 60 and stem 54. Pivoted at one end of the lever 60 is a rectangular button 68 disposed between spaced fingers 69 of a forked arm 70. This arm 70 may be associated with a bombsight 71, whereby one end of the arm 70 is swung in response to changes in the direction setting of the bombsight.

Follow-up means 75 is provided to swing the other end of the arm 60 in response to changes in position of the rudder 31. Extending through a vertical slot 76 in the side plate 51 is a supporting stud 77 provided with an annular shoulder 78 abutting the inner side of the plate 51. This stud is adjustably secured in the vertical slot 76 as by a nut 79. Referring now more particularly to Figure 5, it will be noted that the stud 77 is provided with a reduced free end portion 80 on which is secured, as by a washer 81 and cotter pin 82, a rotatable sleeve 83 provided at one end with an annular shoulder 84. Adjustably supported on the sleeve 83 at slot 85, as by a clamp nut 86, is a lever 87 rigidly carrying a pin 88 that extends, at its free end, between spaced fingers forming a fork 89 at the end of the lever 60 opposite the button 68. When the position of the stud 77 is changed relative to the slot 85, its position is also changed relative to the slot 76 in the side plate 51 so that the lever 87 will remain in the same location.

Rotatably supported in the side plate 51 is a sleeve 90 fixedly carrying a crank arm 91 provided with a longitudinal slot 92 in which a crank pin 93 is adjustably secured, as by a nut 94. This crank pin 93 at its free end extends into a slot 95 in the end portion of the lever 87 opposite the pin 88. Rotatable in the sleeve 90 is a follow-up shaft 96 on which is fastened a conventional follow-up pulley 97 provided with a follow-up cable 98 connected to the rudder servo-motor at fitting 99. Rotatable on the shaft 96 is a worm wheel 100 meshing with a worm 101 fastened on a shaft 102 that is manually rotatable as by turning a knob 103. This worm wheel 100 carries a pair of conventional intermeshing differential pinion gears 104, 105, one gear 104 meshing with a spur gear 106 fixed on the shaft 96 and the other gear 105 meshing with a spur gear 107 fixed on the sleeve 90. Thus, differential motion transmitting means is provided whereby rotation of either one of the shafts 96 and 102 will be transmitted to the sleeve 90.

In the operation of the auxiliary rudder control mechanism C, a change in the direction setting of the bombsight 71 will cause the arm 70 to swing whereby the lever 60, in rocking about the pin 88, will, through the resilient spring 65, shift the stem 54 of the oil valve 42 in a direction depending on the direction of change in the bombsight setting. Thus, when the piston 47 of the valve 43 is positioned so as to bring the oil valve 42 into communication with the rudder servo-motor 22, this servo-motor will tend to deflect the rudder 31 so that the direction of the airplane will change in accordance with the direction of change in the bombsight setting.

Follow-up movement of the rudder servo-motor 22 will be transmitted through the cable 98 and pulley 75 to the shaft 96 which will, through the differential gearing 104—107, turn the sleeve 90 and crank 91. The crank pin 93 working in the slot 95 will swing the lever 87 in decreasing ratios as the crank 91 departs in either direction from its neutral position. Swinging of the lever 87 will, through the pin 88, shift the lever 60 so as to return the stem 54 to its original position. Thus, the oil valve 42 is recentered and further movement of the rudder servo-motor 22 away from neutral is prevented. As the aircraft turns toward the direction of travel in order to satisfy the bombsight 71, the arm 70 thereof will commence retracting the lever 60 to its original position, and the rudder servo-motor is moved toward its neutral position.

Various changes may be made in the form of invention herein shown and described without departing from the spirit of the invention or the scope of the following claims.

The invention described herein may be manufactured and/or used by or for the Government of the United States of America for governmental purposes without the payment of any royalties thereon or therefor.

What is claimed is:

1. In an aircraft automatic pilot having aileron operating means, gyroscopic means and rudder operating means interconnected for automatic control, the combination therewith comprising; a bombsight and auxiliary rudder control mechanism, said auxiliary rudder control mechanism comprising a chassis, a stem mounted for slidable movement in said chassis constructed and arranged to effect operation of the rudder operating means, a block having a slot carried by said stem, a lever extending through said slot and connected to said block for sliding and swinging movement relative thereto, resilient means associated with the connection aforesaid for restraining said movement, means connecting one end of said lever to said bombsight for shifting said lever at one end, and a follow-up connection responsive to changes in position of the rudder operating means for shifting the lever at its opposite end.

2. In an aircraft automatic pilot having aileron operating means, gyroscopic means and rudder operating means interconnected for automatic control, the combination therewith comprising; a bombsight and auxiliary rudder control mechanism, said auxiliary rudder control mechanism comprising a chassis, a stem mounted for slidable movement in said chassis constructed and arranged to effect operation of the rudder operating means, a block having a slot carried by said stem, a lever extending through said slot and connected to said block for sliding and swinging movement relative thereto, resilient means associated with the connection aforesaid for restraining said movement, means connecting one end of said lever to said bombsight for shifting said lever at one end, a follow-up connection responsive to changes in position of the rudder operating means for shifting the lever at its opposite end, said follow-up connection including rotatable means carried by said chassis.

3. In an auxiliary rudder control, a rudder operating means including a fluid motor, a motive fluid control valve for controlling the rudder operating motor having a horizontal axially slidable operating shaft, a longitudinal horizontally opening slot in said shaft and a pin horizontally extending from said shaft adjacent said slot, a vertically disposed lever having a pin for a fulcrum slidable in said slot, a forked lower end for receiving a crank pin, and a lug near the upper end, a pair of spring strips mounted on said lug for straddling the two pins to urge them into alignment, the upper end of said lever being connected to a bomb sight actuated means to move said lever end substantially horizontally in a direction parallel to the valve shaft, a follow-up means connected to the rudder operating means, a crank operated by said follow-up means having a crank pin, a second vertically disposed lever having a fixed fulcrum and a crank pin at its lower end extending into the forked lower end of the first vertically disposed lever, said second vertically disposed lever having a slot in its upper end for receiving the crank pin of the crank operated by the follow-up means, and means for manually adjusting the relation between said follow-up means and the crank operated by said follow-up means.

4. In an aircraft automatic pilot having aileron operating means and elevator operating means interconnected for operation in accordance with rudder movements and a gyro controlled rudder operating means including a fluid motor controlled by a motive fluid control valve; an auxiliary rudder control comprising an auxiliary control valve having a horizontal axially slidable operating shaft, a longitudinal horizontally opening slot in said shaft and a pin horizontally extending from said shaft adjacent said slot, a vertically disposed lever having a pin for a fulcrum slidable in said slot, a forked lower end for receiving a crank pin, and a lug near the upper end, a pair of spring strips mounted on said lug for straddling the two pins to urge them into alignment, the upper end of said lever being connected to a bomb sight actuated means to move said lever end substantially horizontally in a direction parallel to the valve shaft, a follow-up means connected to the rudder operating means, a crank operated by said follow-up means having a crank pin, a second vertically disposed lever having a fixed fulcrum and a crank pin at its lower end extending into the forked lower end of the first vertically disposed lever, said second vertically disposed lever having a slot in its upper end for receiving the crank pin of the crank operated by the follow-up means, means for manually adjusting the relation between said follow-up means and the crank operated by said follow-up means, and means for selectively shifting the control of said rudder operating motor from one valve to the other whereby the aircraft may be controlled either by the gyro or by the bomb sight.

5. In an aircraft automatic pilot having aileron operating means and elevator operating means interconnected for operation in accordance with rudder movements and a gyro controlled rudder operating means including a fluid motor controlled by a motive fluid control valve; an auxiliary rudder control comprising an auxiliary control valve having a horizontal axially slidable operating shaft, a longitudinal horizontally opening slot in said shaft and a pin horizontally extending from said shaft adjacent said slot, a vertically disposed lever having a pin for a fulcrum slidable in said slot, a forked lower end for receiving a crank pin, and a lug near the upper end, a pair of spring strips mounted on said lug for straddling the two pins to urge them into alignment, the upper end of said lever being connected to a bomb sight actuated means to move said lever end substantially horizontally in a direction parallel to the valve shaft, a follow-up means connected to the rudder operating means, a crank operated by said follow-up means having a crank pin, a second vertically disposed lever having a fixed fulcrum and a crank pin at its lower end extending into the forked lower end of the first vertically disposed lever, said second vertically disposed lever having a slot in its upper end for receiving the crank pin of the crank operated by the follow-up means, means for manually adjusting the relation between said follow-up means and the crank operated by said follow-up means, means for selectively shifting the control of said rudder operating motor from one valve to the other whereby the aircraft may be controlled either by the gyro or by the bomb sight, and means for rendering said automatic controls ineffective so that the aircraft may be manually controlled.

PLINY G. HOLT.